United States Patent
Bilanin et al.

(10) Patent No.: US 7,444,246 B2
(45) Date of Patent: Oct. 28, 2008

(54) SYSTEM AND METHOD FOR DETERMINING FLUCTUATING PRESSURE LOADING ON A COMPONENT IN A REACTOR STEAM DOME

(76) Inventors: Alan J. Bilanin, 62 Battle Rd., Princeton, NJ (US) 08540; Milton E. Teske, P.O. Box 248 (456 Main St.), Crosswicks, NJ (US) 08515

( * ) Notice: Subject to any disclaimer, the term of this patent is extended or adjusted under 35 U.S.C. 154(b) by 71 days.

(21) Appl. No.: 11/135,806

(22) Filed: May 24, 2005

(65) Prior Publication Data
US 2006/0078081 A1    Apr. 13, 2006

Related U.S. Application Data

(60) Provisional application No. 60/573,844, filed on May 25, 2004.

(51) Int. Cl.
*G06F 3/02* (2006.01)
(52) U.S. Cl. .................. 702/54; 702/50; 702/100; 702/106
(58) Field of Classification Search .................. 702/54, 702/57, 64, 123, 133, 138, 186, 39, 98, 100, 702/106, 50; 73/24, 5, 25, 24.05; 60/206, 60/725; 703/18, 5; 395/500
See application file for complete search history.

(56) References Cited

U.S. PATENT DOCUMENTS

| | | | | |
|---|---|---|---|---|
| 5,101,774 A * | 4/1992 | Marziale et al. | ........ | 122/504.2 |
| 5,285,675 A * | 2/1994 | Colgate et al. | ........ | 73/23.2 |
| 5,604,893 A * | 2/1997 | Burnett et al. | ........ | 703/2 |
| 5,619,433 A * | 4/1997 | Wang et al. | ........ | 703/18 |
| 5,682,410 A * | 10/1997 | McGrady et al. | ........ | 376/246 |
| 5,887,043 A * | 3/1999 | Spinks | ........ | 376/298 |
| 6,732,575 B2 * | 5/2004 | Gysling et al. | ........ | 73/61.79 |
| 6,987,826 B2 * | 1/2006 | Casillas et al. | ........ | 376/245 |

OTHER PUBLICATIONS

Gordon J. Van Wylen, Thermodynamics, John Wiley & Sons, Inc. (1963), pp. xxi-xxiii, 229-263.

* cited by examiner

*Primary Examiner*—Eliseo Ramos-Feliciano
*Assistant Examiner*—Felix Suarez
(74) *Attorney, Agent, or Firm*—David M. Quinlan, P.C.

(57) ABSTRACT

A system and method for accurately estimating the fluctuating pressure loads on components, such as steam dryers, within a BWR steam dome using pressure time history measurements made on components of the BWR facility external to the steam dome. The method uses existing sensors to obtain the pressure time histories. An accurate determination of the fluctuating pressure loads within the steam dome may be obtained by modeling and analyzing the steam delivery system external to the steam dome, including all possible acoustic sources, using acoustic circuit methodology and pressure time histories, and then coupling these results, essentially as part of the boundary conditions, to the solutions for Helmholtz equation within the steam dome.

41 Claims, 14 Drawing Sheets

SYSTEM AND METHOD FOR DETERMINING FLUCTUATING PRESSURE LOADING ON A COMPONENT IN A REACTOR STEAM DOME

CROSS REFERENCE TO RELATED APPLICATIONS

This application is related to, and claims priority from U.S. Provisional Patent application No. 60/573,844 filed on May 25, 2004 by Alan J. Bilanin entitled "Methodology to determine unsteady pressure loading on components in reactor steam domes", the entire contents of which are hereby incorporated by reference.

FIELD OF THE INVENTION

The present invention relates to the field of determining fluctuating pressure loading and more particularly, to determining fluctuating pressure loading on a component in a reactor steam dome.

BACKGROUND OF THE INVENTION

Boiling water nuclear reactors (BWR) have simple, robust designs and have been operating successfully in the US for many years. Based on this history of successful operation, many BWR operators want to extend the life of their reactors from the planned 35 years to 50 years and to increase the power from the reactors by about 15 to 20%. This increase in power may be obtained by simply increasing the rate of flow of steam, while keeping the total pressure in the system constant. This is possible because reactor power plants are designed to operate with the main control valves only 40% open. By opening the valves slightly more (to about 46-48% open) steam can be made to flow through the existing pipe system 15-20% faster, with no increase in the total pressure. As the power obtained from a steam turbine is proportional to the combination of steam density, which is directly proportional to pressure, and velocity, this will result in a corresponding increase in power output. Moreover, as there is no increase in total system pressure, the existing power station structure should not need to be changed in any fundamental way.

The only significant uncertainty in making such a change is in predicting the changes in flow-induced vibrations that will result from the increased flow rate of the steam. The existing plants have a long history of operating at the present flow rates and dealing with the resultant flow-induced vibrations. Changing the rate of flow is going to change the vibrations, but exactly how they will change is not easy to predict or to measure.

The lack of predictability occurs, in part, because most flow-induced vibration mechanisms involve shear layers, and therefore scale with dynamic pressure at a constant Mach number. (Dynamic pressure is the component of a fluid pressure that represents fluid kinetic pressure and is equal to one half the fluid density multiplied by the square of the fluid velocity). Because the BWR power increases are obtained at constant total pressure by increasing the velocity of the steam flow, both the Mach number, and the dynamic pressure, increase. Simple scaling laws are therefore, not so easily deduced. Moreover, a real BWR system has a multitude of geometric discontinuities, such as junctions and branch lines of various lengths and diameters, making the prediction of the flow-induced vibrations that will result from the increased steam flow an extremely complex task.

Direct measurement of the effects of the changed flow induced vibrations is prohibitively expensive, because fitting measurement devices to components within the steam dome is extremely expensive and, because the fitted devices do not last long in the high temperatures and highly radioactive conditions within the steam dome.

What is needed is an inexpensive and reliable system and method for estimating the fluctuating pressure loads on components within a BWR steam dome without the need to make measurements within the BWR steam dome.

SUMMARY OF THE INVENTION

The present invention provides a system and method for accurately estimating the fluctuating pressure loads on components, such as steam dryers, within a BWR steam dome using pressure time history measurements made on components of the BWR facility external to the steam dome.

In a preferred embodiment, the method of this invention uses existing sensors on the main steam lines that transport the reactor generated steam from the reactor steam dome to the power turbines, to obtain the necessary pressure time histories from which the fluctuating pressure loads on reactor components may be computed.

In a preferred embodiment of the invention, these pressure time histories are used to calculate the fluctuating mass flux at the inlets to the main steam lines. These fluctuating mass fluxes can then be used as part of the boundary conditions of a 3-D Helmholtz or an 3D unsteady wave equation. The fluctuating pressure loads on reactor components are obtained by solving these equations.

To calculate the fluctuating mass flux at the inlets to the main steam lines, parts of the steam delivery system external to the steam dome, including all included, possible acoustic sources, may be modeled and analyzed using acoustic circuit methodology and the pressure time histories. The acoustic circuit methodology comprises solving a 1D wave equation over the piping elements, applying pressure and mass continuity constraints at element junctions and having factors that allow for the damping effects of friction in the pipes.

The fluctuating pressure loading on the components within the steam dome can then be found by coupling these results, essentially as part of the boundary conditions, to a 3D wave equation solver within the steam dome. In a preferred embodiment of the invention, the wave equation used is the Helmoltz equation, which is applicable because of the low Mach number (0.1) of the steam within the steam dome. The Helmholtzs equation solver effectively provides a transfer function between the fluctuating pressure load in the main steam lines and the steam dryer components. In this way, an accurate determination of fluctuating pressure loads within the steam dome can be obtained as the steam flow rate is changed.

These and other aspects of the present invention will now be described with reference to the accompanying drawings.

DETAILED DESCRIPTION

Figure 1:
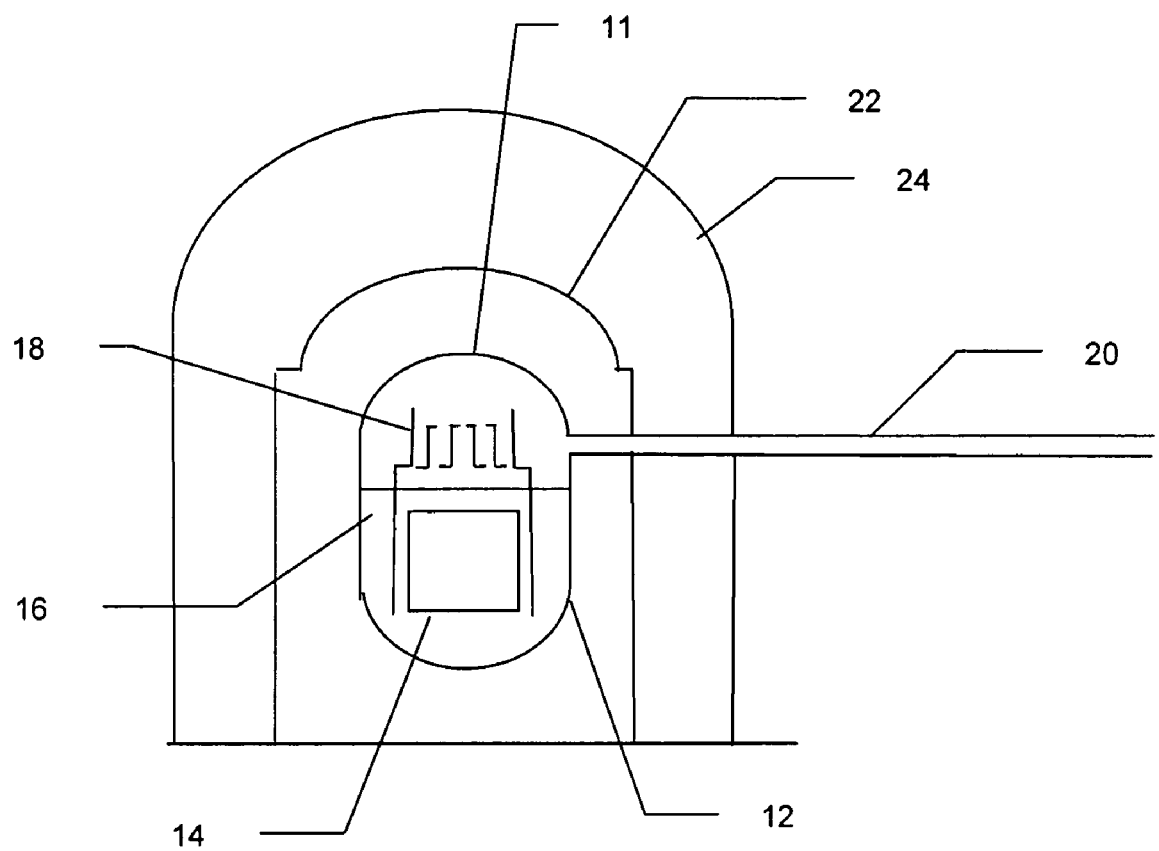
FIG. 1 is a drawing showing a schematic cross-section of a typical boiling water nuclear reactor (BWR).

The present invention relates to systems and methods of determining fluctuating or unsteady pressure loads on a component within a reactor steam dome.

To increase the power output from existing BWR nuclear power plants without structural changes, power plant operators would like to increase the velocity of the steam while keeping the total pressure of the system nearly the same. Although the total pressure of the system will not change, the increased steam velocity will change the fluctuating pressure loads on components, including components such as the steam dryers within the reactor steam dome. It is highly desirous to determine how these fluctuating pressures loads change so that appropriate strengthening of components can be made, if necessary.

There are, however, fundamental difficulties in predicting how fluctuating pressures will change with changes in steam velocity. Furthermore, the hostile, radioactive environment within the steam dome makes direct measurement of the vibrations on components very expensive and difficult.

To overcome these difficulties, the system and method of this invention provide a practical way to infer loads on components, such as steam dryers, that are located within the steam dome of a nuclear reactor. In a preferred embodiment of the present invention, this may be accomplished by making fluctuating pressure measurements on one or more main steam pipes external to the steam dome, and using these pressure time history measurements, along with proven analytical methods, to infer the fluctuating pressure loads on the components within the reactor's steam dome.

In this preferred embodiment of the present invention, a complex Navier-Stokes computational analysis of the steam supply system is avoided. Instead, the pressure loadings in the relevant portions of the steam supply system are determined by first characterizing the sources in the system, and then taking advantage of acoustic circuit analysis that assumes viscous, 1D unsteady compressible flow in the steam delivery piping. The acoustic circuit analysis of how the fluctuating pressure loading from the acoustic sources propagates through the steam supply system comprises solving a 1D wave equation over the piping elements, applying pressure and mass continuity constraints at element junctions and having factors that allow for the damping effects of friction in the pipes. There are also certain inlets and valves that require individual modeling, and are included in the acoustic circuit analysis in a way that is loosely analogous to hydrodynamic finite circuit analysis.

The results of the acoustic circuit analysis are then coupled to a separate computational analysis to determine, for instance, steam dryer loadings within the reactor steam dome. In a preferred embodiment of the invention, this separate computational analysis comprises a Helmoltz solver within the steam dome, which effectively provides a transfer function between the main steam line and the steam dryer components. Although use of a Helmholtz solver implies carrying out the analysis in frequency space, because the analysis is linear, one of ordinary skill in the art will appreciate that the analysis could equally well be conducted in the time domain, or a combination of time and frequency domains, by suitable Fourier or Fourier related transforms between the time and frequency domains.

In this way the fluctuating pressure loadings on the components can be inferred as the steam flow rate is increased, so that any necessary strengthening of the dryer components can be calculated and implemented at, for instance, the next scheduled refueling of the reactor.

These and other aspects of the invention will now be described in detail by reference to the attached drawings in which, as far as possible, like numbers represent like elements.

FIG. 1 is a drawing showing a schematic cross-section of a typical boiling water nuclear reactor (BWR) 10. The BWR 10 comprises a reactor vessel 12 containing the nuclear pile 14, water 16, dryers 18 and a steam dome 11. The reactor vessel 12 is contained with in an inner containment structure 22 and an outer containment structure 24. The nuclear pile 14 heats the water 16, creating steam which rises up through the dryers 18 and is taken out of the containments structures along steam pipes 20 to the steam turbines (not shown). Condensed steam is returned into the reactor vessel 12 along return water pipes (not shown). Because of the expense and difficulty of making measurements directly on structures such as, but not limited to, the dryers 18, the method of this invention allows pressure time history measurements to be made on the steam pipe 20 either inside or outside of the containment wall, preferably using existing monitoring devices, and these measurements used to infer the fluctuating pressure loading on the dryer 18 and other structures within the steam dome 11.

Figure 2:
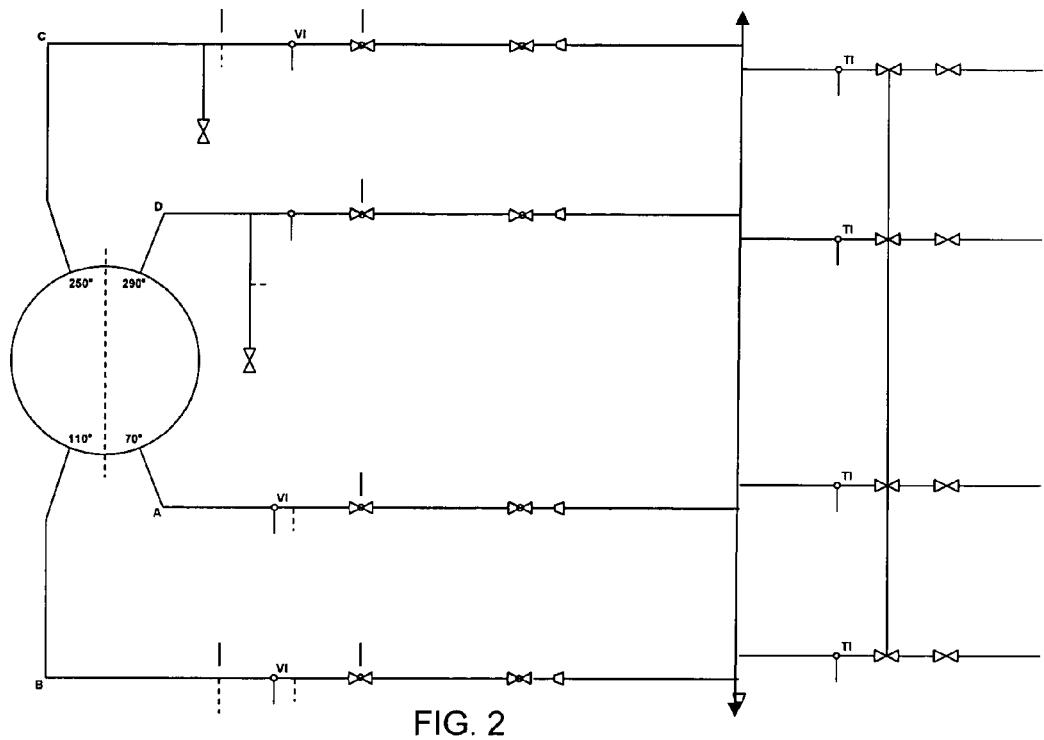
FIG. 2 is a schematic drawing showing an exemplary main steam line pipe geometry for a BWR.

FIG. 2 is a schematic drawing showing a representation of an exemplary steam-pipe geometry of a nuclear power plant, showing the complex arrangement of steam pipes and valves. The inlets and junctions of the steam pipe result in additional acoustic sources that complicate the analysis of fluctuating pressure within the steam chamber based on measurements taken on steam pipes outside the steam chamber. In principal, for each such acoustic source, there needs to be a further independent pressure-time history measurement made in order to obtain the fluctuating pressure distribution within the steam chamber.

In analyzing steam flowing within a steam delivery system of a nuclear power plant such at that depicted in FIG. 2, certain simplifications can be made.

Within the steam dome, the main steam line velocities are of the order of 200 ft/sec. As the velocity of sound (a) is about 1600 ft/sec, the Mach number of the steam flow is approximately 0.1. At such low Mach numbers, the pressure oscillations (P) are dominated by the acoustic pressure component and can be modeled by a reduced form of the convective wave equation, namely the standard wave equation:

$$\frac{1}{a^2}\frac{\partial^2 P}{\partial t^2} - \nabla^2 P = 0 \quad (1)$$

where $\nabla^2$ denotes the Laplacian operator and t is time.

In the steam lines of a BWR system, the propagating acoustic pulsations can be considered to be essentially one dimensional, as the pipe lengths are typically long (50-100 ft) compared to the pipe diameter (typically 2 ft). As the flow is essentially one-dimensional, the pressure satisfies the following equation:

$$\frac{1}{a^2}\frac{D^2 P}{Dt^2} - \frac{\partial^2 P}{\partial x^2} = 0 \quad (2)$$

where $$\frac{D}{Dt} = \frac{\partial}{\partial t} + U\frac{\partial}{\partial x},$$

and U is the mean velocity in the main steam line.

This equation can be used to provide an acoustic analysis of the system for wavelengths that are long compared to the lateral dimensions of the system, as described in detail below.

Figure 3A:
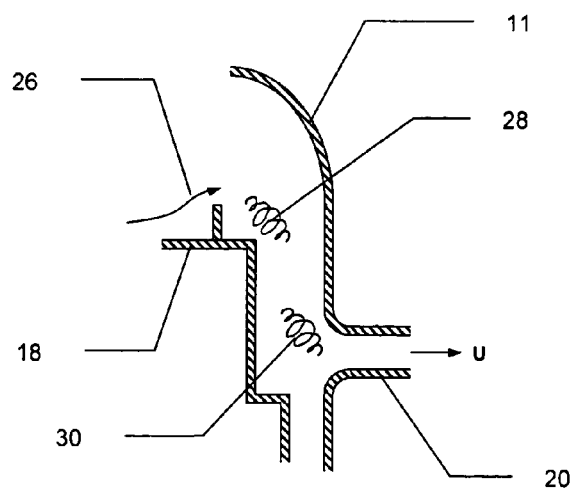
FIGS. 3A, 3B and 3C are schematic drawings showing three types of acoustic source in a typical piping system in a BWR nuclear power plant.
Figure 3B:
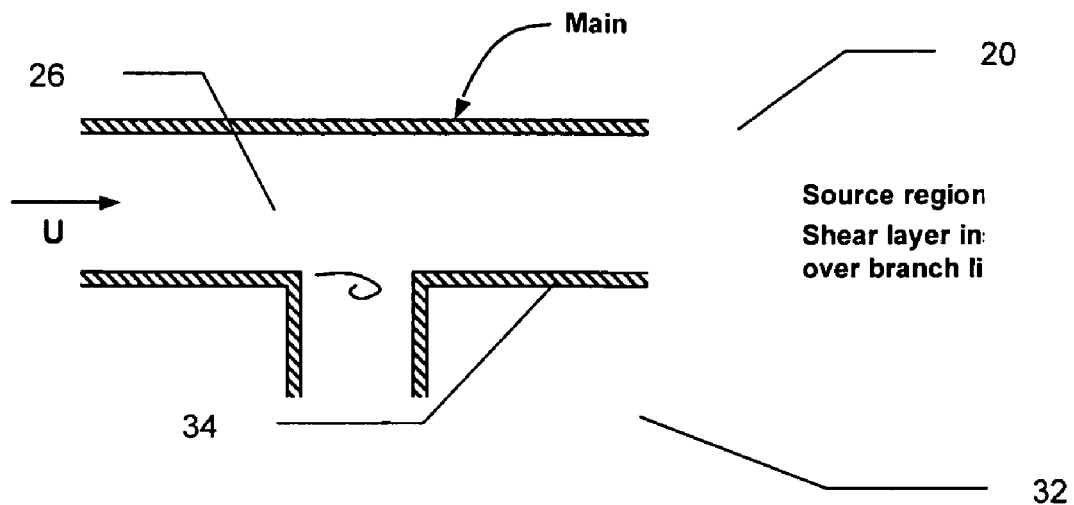
Figure 3C:
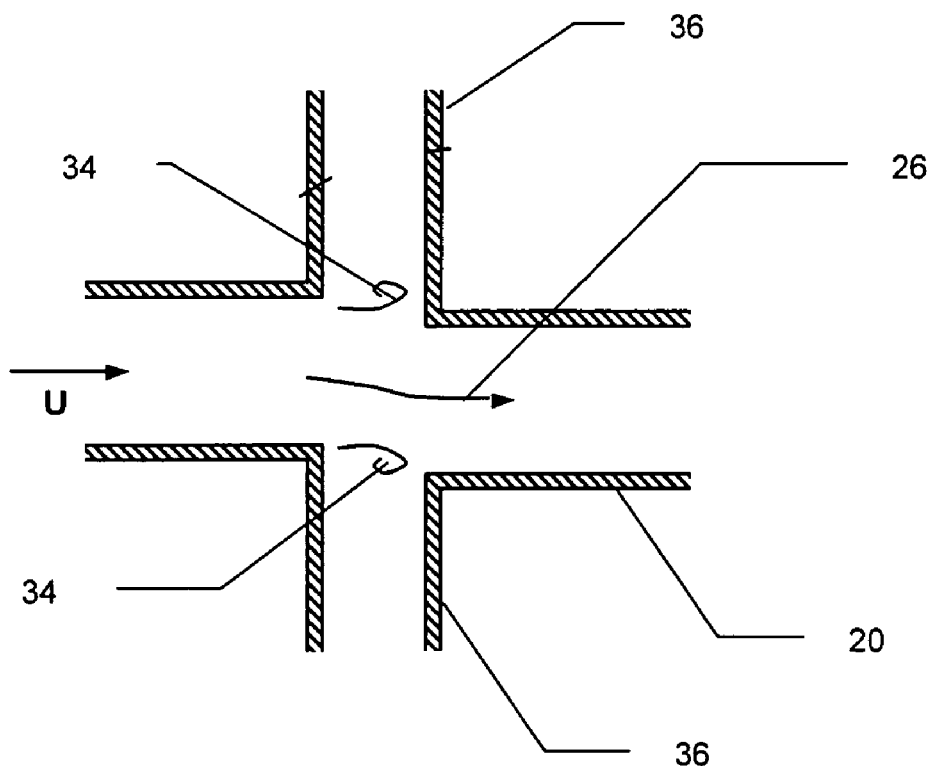

Possible acoustic sources occur in regions of geometric discontinuities. FIGS. 3A, 3B and 3C show three such types of acoustic source in a typical piping system in a BWR nuclear power plant.

FIG. 3A shows a first type of acoustic source region. The steam 26, flowing over the top of the dryer 18 towards the main steam line 20, sheds vortices 28 and 30. As the vortices 28 and 30 oscillate, the pressure drop entering the main steam line 20 fluctuates and can drive the acoustic column that is the main steam line 20 leading to the control valves, not shown.

FIG. 3B shows a second type of acoustic source region that is well known and occurs where a shear flow 26 passes over a dead end branch line 32. It is well known that if the velocity (U) over the branch line is U≈0.55 da/L, where d is the diameter and L is the length of the branch line, respectively, the branch line is excited at the quarter standing acoustic wave in the branch line (also referred to as the first organ pipe mode). Acoustic oscillations exist at a frequency of a/4L and radiate into the flowing system. This mechanism is postulated to occur at the turbine equalizer lines located upstream of the control valves as well as in the stand pipes that lead to the safety relief valves (not shown).

FIG. 3C shows a third type of acoustic source region, which is similar to the dead end branch line excitation described above, but 36 involves two branch lines at the same location in the main steam line 20, which may be coaxial branch lines. Note that in some coaxial configurations, the main steam line can also undergo a step change in its flow axis 26, as shown in FIG. 3C. Very intense oscillations can be established in such configurations, especially when the coaxial branches are the same length. The velocity for maximum oscillation amplitude is observed to be U≈0.8 da/L, where both coaxial branch lines have length L. For coaxial branch lines with different lengths, the phenomenon is more complex.

Modeling the pressure fluctuations in source regions such as those shown in FIGS. 3A, 3B and 3C explicitly is beyond the state of the art. These regions are, however, compact compared to the pipe lengths in typical nuclear power plant systems, and typically sufficient in-plant data exists to allow the sources in these regions to be extracted from the data. Therefore, the general approach is to use in-plant measured data to determine the source time history. Additional data, if available, may then be used to validate the methodology.

Figure 4:
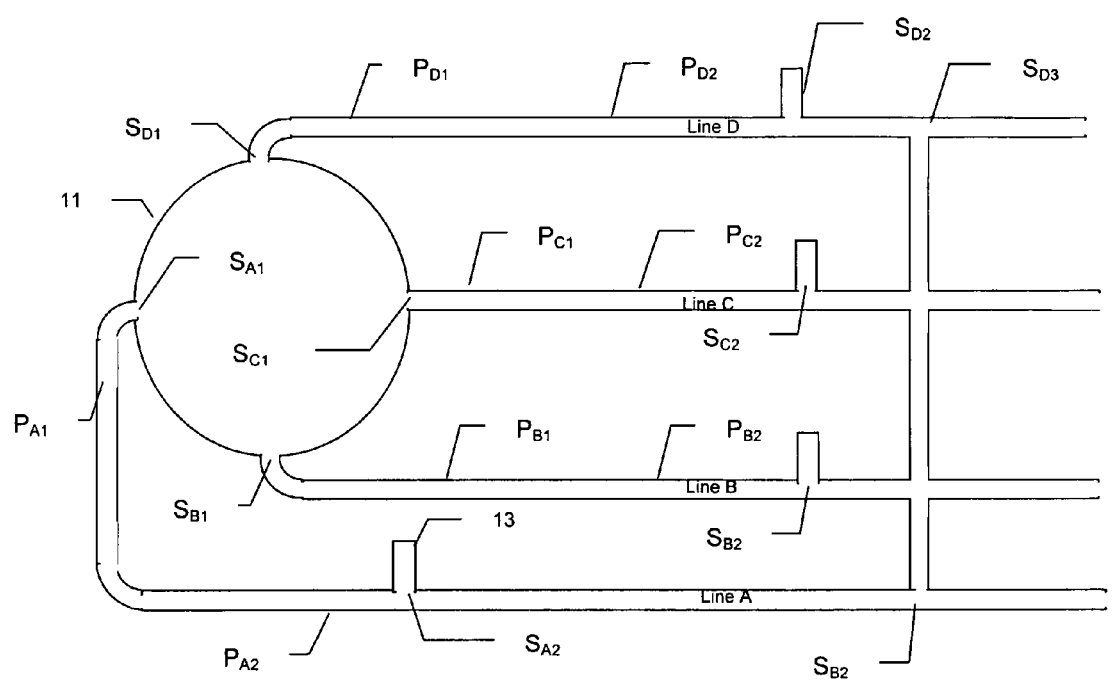
FIG. 4 is a schematic drawing showing a representation of an exemplary steam-pipe geometry with acoustic source locations and instrument locations for a BWR that allows model closure.

FIG. 4 is a schematic drawing showing a representation of an exemplary steam-pipe geometry with acoustic source locations and instrument locations for a BWR that allows model closure.

In a simple application of a preferred embodiment of the present invention, pressures are measured immediately downstream of the reactor vessel 11 at two locations on each line, i.e. at locations $P_{A1}$ and $P_{A2}$ on steam line A, locations $P_{B1}$ and $P_{B2}$ on steam line B, locations $P_{C1}$ and $P_{C2}$ on steam line C, and locations $P_{D1}$ and $P_{D2}$ on steam line D. The locations $P_{XN}$ are chosen so that no acoustic source $S_{XN}$ exists between the two pressure measurements on that steam line. For instance, on steam line A, the two measurements $P_{A1}$ and $P_{A2}$ occur between the source $S_{A1}$, located at the junction between steam line A and the reactor vessel 11, and the next acoustic source in steam line A, $S_{A2}$ that occurs at the junction of line A with sideline 13.

The distance between the two pressure measurements is made as large as is practical in order to improve the estimation of the low frequency part of the pressure loading on the reactor components. For instance, on line A, measurement $P_{A1}$ is ideally made as close as practically possible to source $S_{A1}$ while measurement $P_{A2}$ is ideally made as close as practically possible to source $S_{A2}$. As no acoustic sources exist between the two measurements, acoustic circuit analysis can be used to compute the fluctuating mass flux and pressure gradient between the two measurements as well as the fluctuating mass flux and pressure gradient at the inlet region to the steam line, i.e., at the junction between the steam lines A, B, C or D and the reactor vessel 11. Having obtained an estimate of the fluctuating mass flux at the points at which the steam leaves the reactor steam dome 11 and enters the steam lines, appropriate boundary conditions may be specified for the remaining regions of the steam dome, i.e. on the steam-water interface within the reactor and normal rigid wall boundary conditions on the reactor vessel walls and on components within the reactor. The unsteady acoustic loading on all the reactor components can then be obtained directly by, for instance, the numerical solution of a Helmholtz equation for the fluctuating pressure field.

One of ordinary skill in the art will readily appreciate that acoustic circuit analysis is not the only method that can be used to obtain the fluctuating (also known as "unsteady") mass flux at the inlet region from the reactor steam dome into the main steam lines. The necessary fluctuating flux measurements may also be obtained from the pressure measurements $P_{XN}$ using, for instance, finite difference analysis or finite element analysis of the acoustic components in the time domain. And as before, once the unsteady mass flux into each steam line is specified from the measured pressure histories, the unsteady pressure loadings on the reactor components can be obtained in the time domain by solving a linear 3 D wave equation in the reactor steam dome, or in frequency space by solving the 3D Helmholtz equation for the pressure.

In a preferred embodiment of the invention, the simplest and most accurate determination of a fluctuating pressure loading on a component inside a reactor steam dome is made in the following manner.

Step 1. Pressure measurements are made at two locations per steam line for all steam lines transporting steam out of a reactor steam dome 11. In the arrangement shown in FIG. 4, this means making a total of eight pressure measurements at the points $P_{A1}, P_{A2} \ldots P_{D1}, P_{D2}$. As detailed above, the two points at which pressure measurements are made in each line are chosen so that the first measurement is made as close to the reactor vessel as practical, while the second measurement is made as far down the steam line as practical before another possible acoustic source is encountered, i.e., before the next branch line or other discontinuity.

Step 2. Acoustic circuit analysis, detailed below, is then used in the frequency domain to obtain the fluctuating mass fluxes at the inlet regions from the steam dome to the main steam lines. In the arrangement of FIG. 4, this comprises calculating the four values $U_A(0, \omega)$, $U_B(0, \omega)$, $U_C(0, \omega)$ and $U_D(0, \omega)$ representing the fluctuating velocities which are proportional to the mass fluxes for each of the steam lines A, B, C and D at position 0 along the steam line as a function of frequency $\omega$. It is assumed that the coordinate system x is measured downstream from the reactor vessel on each steam line.

Step 3. Calculate the fluctuating pressure on the components within the steam dome. This fluctuating pressure may be represented as $P(y, \omega)$, the pressure P on the component surface as a function of position y and frequency $\omega$. This may be calculated by solving the Helmholtz equation:

$$\nabla^2 P + \frac{\omega^2}{a^2} P = 0$$

where P is pressure, $\omega$ is frequency, and a is acoustic speed, subject to the boundary conditions:

$$\frac{\partial P}{\partial n} = 0$$

normal to all solid surfaces (i.e., the steam dome wall and interior and exterior surfaces of the dryer), and:

$$\frac{\partial P}{\partial n} = \frac{i\omega}{a} ZP$$

normal to the nominal water level surface, i.e. the steam water interface and:

$$U_A(0, \omega), U_B(0, \omega), U_C(0, \omega), U_D(0, \omega)$$

at the respective entrances to each of the steam lines.

In an alternative but equivalent preferred embodiment, the one dimensional wave equation:

$$\frac{1}{a^2} \frac{\partial^2 P}{\partial t^2} - \frac{\partial^2 P}{\partial x^2} = 0$$

may be solved numerically using the pressure measurements at the points $P_{A1}, P_{A2} \ldots P_{D1}, P_D$ to obtain the fluctuating velocities at the inlet regions from the steam dome to the main steam lines as a function of time. In the arrangement of FIG. 4, this comprises calculating the four values $U_A(0, t)$, $U_B(0, t)$, $U_C(0, t)$ and $U_D(0, t)$ representing the fluctuating velocities U for each of the steam lines A, B, C and D at position 0 along the steam line as a function of time t.

These may then be transformed to frequency space and the Helmholtz equation solved with suitable boundary conditions as detailed above.

Alternatively, the 3D unsteady wave equation:

$$\nabla^2 P - \frac{1}{a^2} \frac{\partial^2 P}{\partial^2 t} = 0$$

may be solved in the time domain subject to the boundary conditions that the fluctuating velocities at the inlet regions from the steam dome to the main steam lines are $U_A(0, t)$, $U_B(0, t)$, $U_C(0, t)$ and $U_D(0, t)$.

Figure 5:
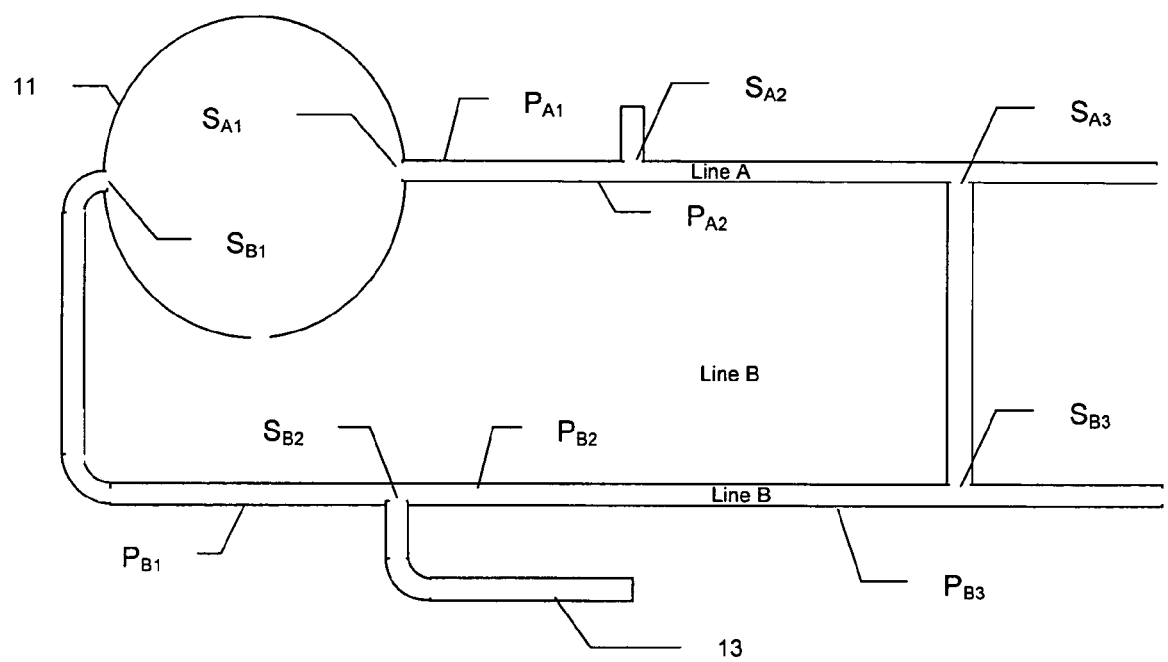
FIG. 5 is a schematic drawing showing a representation of a further exemplary steam-pipe geometry with acoustic source locations and instrument locations for a BWR that allows model closure.

FIG. 5 is a schematic drawing showing a representation of a further exemplary steam-pipe geometry with acoustic source locations and instrument locations for a BWR that allows model closure.

In preparing to calculate the fluctuating pressure loading on components internal to the reactor steam dome, a determination must first be made of the potential acoustic sources within the steam delivery system. This may be done, for instance, by examining suitably scaled and accurate engineering plans of the pipe work to locate where, in each steam line, there is a branch line area discontinuity, or a flow obstruction, and where the mean steam flow velocities are high enough to potentially be an acoustic source.

In FIG. 5, such potential acoustic sources are labeled $S_{A1}$, $S_{A2}$ and $S_{A3}$ on line A and $S_{B1}$, $S_{B2}$ and $S_{B3}$ on line B.

The next step in the preparation is to survey the main steam lines at the nuclear plant and determine where it is practical to gain access to mount instruments which can obtain the fluctuations of pressure in the main steam lines. Typical instruments for measuring or inferring the pressure include, but are not limited to, direct mounted pressure transducers, strain gauges that measure changes in circumference from which internal pressure can be deduced, or existing instrument lines on which direct measurement pressure transducers can be mounted.

These points of practical pressure measurement are labeled on FIG. 5 as labeled $P_{A1}$, $P_{A2}$ and $P_{A3}$ on line A and $P_{B1}$, $P_{B2}$ and $P_{B3}$ on line B.

Having determined the potential acoustic sources $S_{XN}$ and the points of practical measurement $P_{XN}$ on the main steam lines, a suitable closed model can then be built by, for each steam line, starting at the steam dome end of the steam line, and working along the steam line to find the least number of pressure measurement access points so that there is one more pressure measurement than are included acoustic sources.

For instance, on line A, only the pressure measurement points $P_{A1}$ and $P_{A2}$ are needed for a closed model, as, going along the steam line in the direction of the steam flow from the steam dome 11, when pressure measurement point $P_{A2}$ is reached, there are two pressure measurements, $P_{A1}$, $P_{A2}$, and only one source $S_{A1}$, so the acoustic circuit model on this line can be closed.

On steam line B, however, the plant survey reveals that it is impractical to make more than one pressure measurement immediately after source $S_{B1}$ and before $S_{B2}$. This may be because of physical obstructions or because the two possible measurements would be too close for the required resolution of the calculation. In this case, the required condition of having one more pressure measurement than included sources is only satisfied when measurement point $P_{B3}$ is reached. The line B model, therefore, includes two sources $S_{B1}$ and $S_{B2}$ and three pressure measurements $P_{B1}$, $P_{B2}$ and $P_{B3}$.

On line A, the fluctuating velocity $U_A(0, \omega)$ or $U_A(0, t)$ at the inlet regions from the steam dome may be accomplished using the simple acoustic circuit analysis described in step 2 above.

On line B, obtaining the fluctuating velocity $U_B(0, \omega)$ or $U_B(0, t)$ at the inlet regions from the steam dome, requires first using the pressure measured at $P_{B2}$ and $P_{B3}$ to calculate the fluctuating pressure immediately downstream of source $S_{B2}$. This calculated fluctuating pressure $P'_{B2}$ can then be used with measured fluctuating pressure $P_{B1}$ to obtain the fluctuating mass flux $U_B(0, \omega)$ or $U_B(0, t)$.

Having obtained $U_A(0)$ and $U_B(0)$, either as function of time or frequency, the fluctuating pressure on the components within the steam dome can be calculated as in step 3 above.

Figure 6:
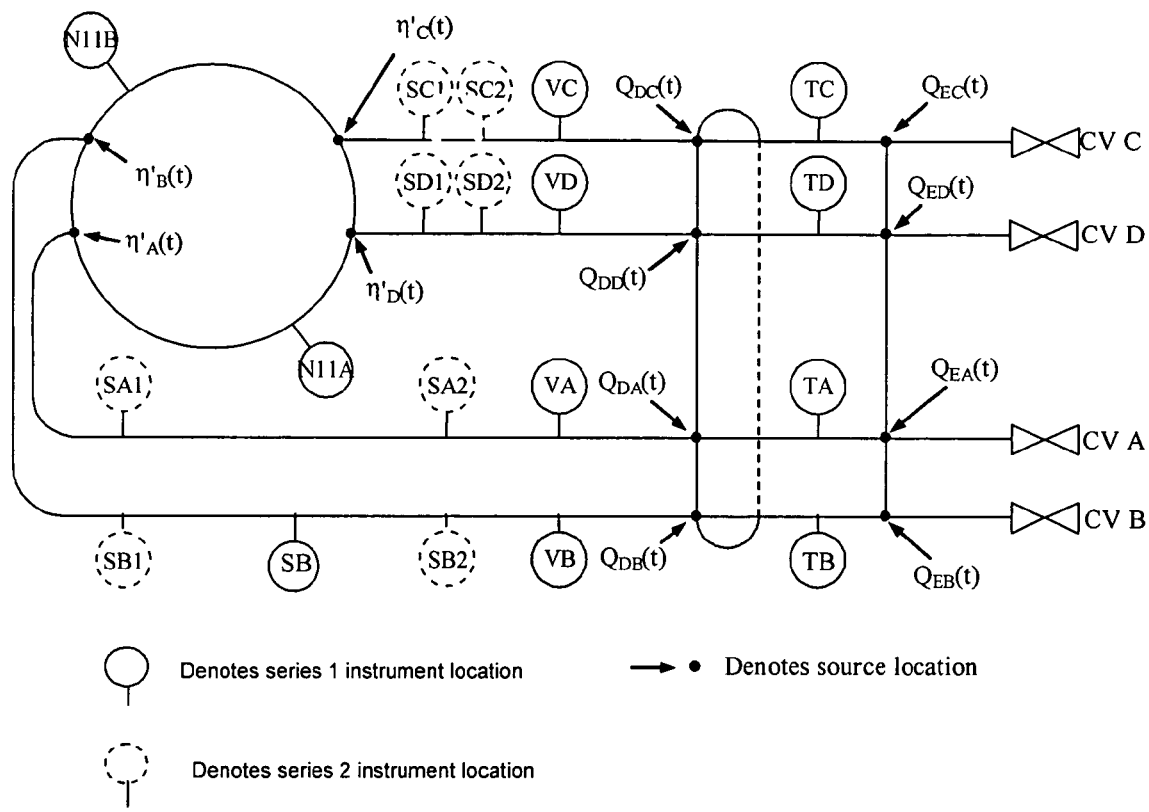
FIG. 6 is a schematic drawing showing a representation of instrument and acoustic source locations in an exemplary BWR nuclear power plant.

FIG. 6 is a schematic drawing showing a representation of two instrument configurations denoted Series 1 and Series 2 and acoustic source locations in a further, more complex exemplary BWR nuclear power plant. In FIG. 6, for the Series 1 instrumentation configuration there are 11 instruments that can be used to collect pressure time histories, but twelve acoustic sources. The method of creating a model in which each main steam line has one more pressure measurement than acoustic source, detailed above, cannot be used. Certain of the acoustic sources, however, have properties that can be inferred to be related, allowing an acoustic circuit solution to be obtained under certain circumstances.

In the example shown in FIG. 6, the 11 Series 1 instruments available to gather pressure time histories are the reference leg transducer N11A at the reactor wall at 45° azimuth, the reference leg transducer N11B at the reactor wall at 225° azimuth, the venturi transducer VA on the main steam line A, the venturi transducer VB on the main steam line B, the venturi transducer VC on the main steam line C, the venturi transducer VD on the main steam line D, the turbine transducer TA on the main steam line at turbine instrument line A, the turbine transducer TB on the main steam line at turbine instrument line B, the turbine transducer TC on the main steam line at turbine instrument line C, the turbine transducer TD on the main steam line at turbine instrument line D and the strain gages SB which allow hoop stress to be converted to steam line pressure. The datasets from these instruments are represented as N11A(t), N11B(t), VA(t), VB(t), VC(t), VD(t), TA(t), TB(t), TC(t), TD(t) and SB(t).

In total, eleven independent data sets are available. There are, however, twelve unknown sources, which are the four unsteady head loss coefficients characterized by $\eta'_A(t)$, $\eta'_B(t)$, $\eta'_C(t)$, and $\eta'_D(t)$, the four volumetric sources at the main steam line D-ring junctions $Q_{DA}(t)$, $Q_{DB}(t)$, $Q_{DC}(t)$, and $Q_{DD}(t)$, and the four volumetric sources at the main steam line equalizing line junctions $Q_{EA}(t)$, $Q_{EB}(t)$, $Q_{EC}(t)$, and $Q_{ED}(t)$.

The hoop stress dataset SB(t) will be used for validation of the method, and therefore there are only ten independent data sets and twelve unknowns. The model can, however, be closed by factoring in the fact that the sources $\eta'_A(t)$, $\eta'_B(t)$, $\eta'_C(t)$, and $\eta'_D(t)$ are related, because they arise from the steam flow separating from the sharp edges of the dryer and applying boundary conditions on the steam line at the control valves. This downstream boundary condition provides in this example four additional relationships By assuming that the lines on the same side of the reactor are in-phase, i.e., $\eta'_A(t)=\eta'_B(t)$ and $\eta'_C(t)=\eta'_D(t)$, the ten data sets, plus four downstream boundary conditions and the two assumptions on phasing give sixteen independent relations and the model is closed. If this assumption also results in correctly calculating SB(t), the method can be validated and used with confidence.

In certain situations, it is also possible to only use strain gages at the positions SA1, SA2, SB1, SB2, SC1, SC2 and SD1, SD2 (Series 2) instrumentation to obtain further independent pressure-time histories. If such data are obtainable, the model can be closed without needing to make assumptions about the phasing of sources at the inlets to the main steam line.

In a preferred embodiment of the present method, the Helmholtz solution within the steam dome is obtained by coupling to an acoustic circuit solution in the main steam lines via the boundary conditions. In particular, fluctuating velocities at the main steam inlets are obtained and are used to provide part of the boundary conditions for obtaining the Helmholtz solution within the steam dome.

A typical BWR steam pipe system, the pressure fluctuations occur in a single-phase compressible medium, where acoustic wavelengths are long compared to characteristic length scales for the internal components and to transverse dimensions (i.e., directions perpendicular to the primary flow directions). The pressure fluctuations in such a system can be determined through, for instance, the application of acoustic circuit methodology. In particular, by restricting the analysis to frequencies below 200 Hz, where acoustic wavelengths are approximately 8 feet in length or longer, and are sufficiently long compared to most components of interest in a typical BWR plant, such as the branch junctions, the pressure fluctuations can be accurately modeled by acoustic circuit analysis.

Figure 7:
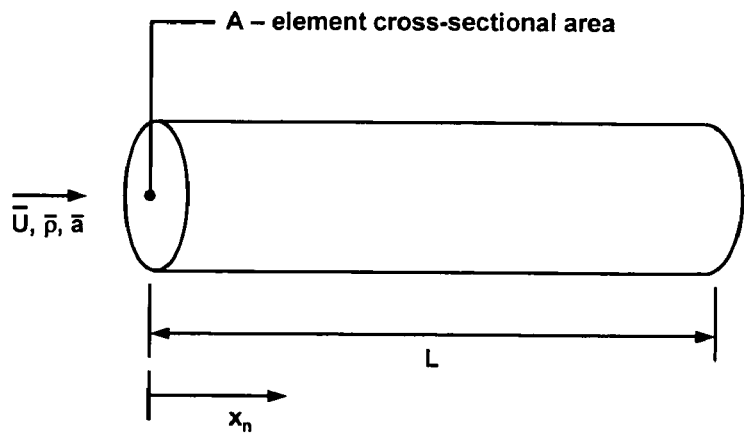
FIG. 7 shows the elements used in acoustic circuit analysis.

Acoustic circuit analysis separates the main steam lines into elements that are characterized by length L, cross-sectional area A, mean fluid density $\bar{\rho}$, mean flow velocity $\bar{U}$, and mean fluid acoustic speed $\bar{a}$, as illustrated in FIG. 7. Application of acoustic circuit methodology provides solutions for the fluctuating pressure $P'_n$ and velocity $u'_n$ for the nth element of the form:

$$P'_n = [A_n e^{ik_{1n} X_n} + B_n e^{ik_{2n} X_n}] e^{i\omega t} \quad (3)$$

$$u'_n = -\frac{1}{\rho \bar{a}^2} \left[ \frac{(\omega + \overline{U}_n k_{1n})}{k_{1n}} A_n e^{ik_{1n} X_n} + \frac{(\omega + \overline{U}_n k_{2n})}{k_{2n}} B_n e^{ik_{2n} X_n} \right] e^{i\omega t}$$

where harmonic time dependence of the form $e^{i\omega t}$ has been assumed. The wave numbers $k_{1n}$ and $k_{2n}$ are the two complex roots of the equation:

$$k_n^2 + if_n \frac{|\overline{U}_n|}{D_n \bar{a}^2}(\omega + \overline{U}_n k_n) - \frac{1}{\bar{a}^2}(\omega + \overline{U}_n k_n)^2 = 0$$

where $f_n$ is a pipe friction factor for the nth element, $D_n$ is an hydraulic diameter for the nth element, and $i=\sqrt{-1}$. The complex constants $A_n$ and $B_n$ in the expressions for the fluctuating pressure and velocity above are a function of frequency. These constants are determined by satisfying continuity of pressure and mass conservation at the element junctions.

Figure 8A:
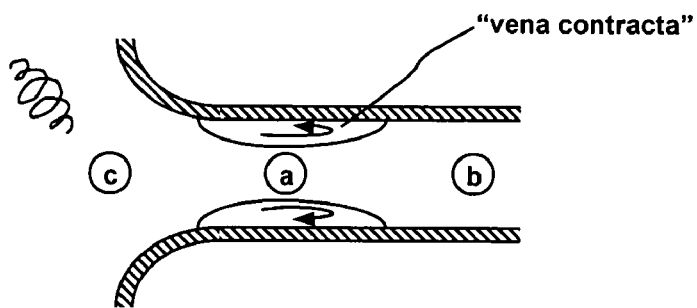
FIG. 8A shows the inlet region from the steam dome to the main steam line that potentially provides an additional source term to the acoustic pressure oscillations.

FIG. 8a shows the inlet region from the steam dome to the main steam line that potentially provides an additional source term to the acoustic pressure oscillations. This region is modeled to allow for non-uniformity in the inflow using a model based on observations that the highly rotational flow entering the main vents can be periodically oscillated by vortex shedding from the top of the dryer skirt. This periodic three-dimensional rotational flow results in time-dependent losses in pressure head in the steam entering the line. This variable head loss is included when connecting the steam dome solution to the acoustic circuit analysis of the main steam line.

Since the inlet region is compact, i.e., acoustic wavelengths are longer than the size of the inlet region, the flow field can be approximated as incompressible. Referring FIG. 8A, the fluctuating pressure across the inlet is determined from the unsteady Bernoulli equation as follows:

$$P'_c - P'_b = K \frac{\rho}{2} \frac{U_b^2}{\eta_o^2} \left\{ 2\frac{u'_b}{U_b} - \frac{2\eta'}{\eta_o} \right\}$$

where
K is the steady head loss coefficient
$\eta_o$ is the fraction of area blocked by the steady vena contracta
$\eta'$ is the fluctuation in the vena contracta
and mass conservation requires that $u'_b = u'_c$.

Figure 8B:
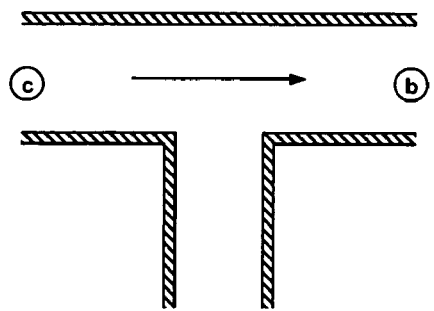
FIGS. 8B and 8C show branch line junctions that are potential acoustic sources.
Figure 8C:
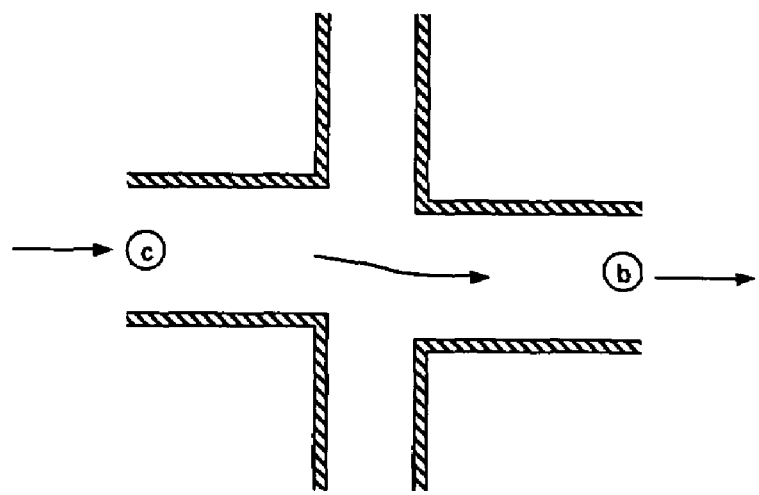

FIGS. 8B and 8C show branch line junctions that are potential acoustic sources, as described in reference to FIGS. 3B and 3C, and that may be analyzed in a similar manner. Referring to 8B and 8C, the pressure balances across the junction such that $P'_c = P'_b$, and a volumetric source Q(t) is added to the mass balance across each junction. The mass balance for both geometries is:

$$u'_c A_c + Q(t) = u'_b A_b$$

where mass addition into the junction by the source is defined as positive, and $A_b$ and $A_c$ are the cross-sectional areas of the main steam line downstream and upstream, respectively, of the junctions.

Figure 8D:
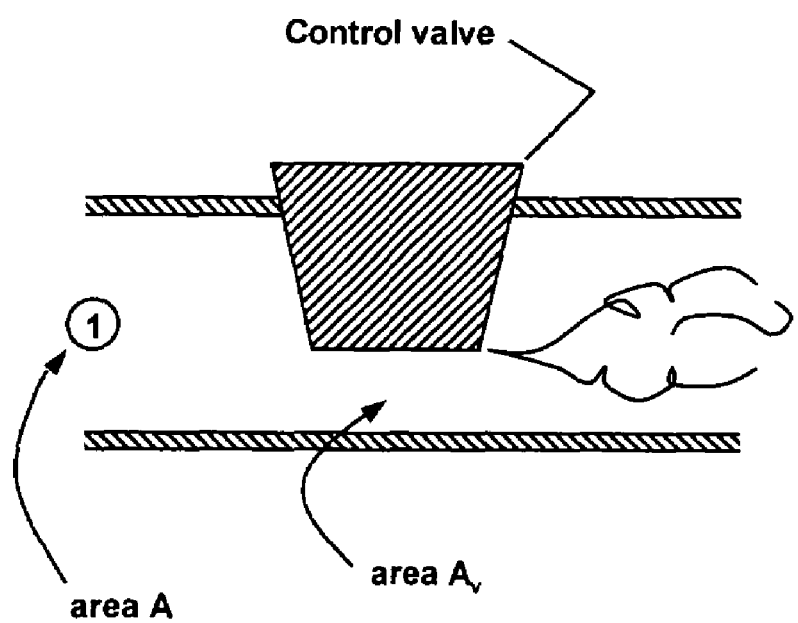
FIG. 8D shows a schematic cross-section of a control valve.

FIG. 8D shows a schematic cross-section of a control valve. Such control valves are located before the inlets to the steam turbine and represent the end of the modeled system. Control valves, which are typically open 40%, are modeled with the assumption that downstream acoustic disturbances do not propagate upstream through the valve. This assumption is approximate and becomes more valid as the pressure drop across the valve is increased. Referring to 8D, the upstream pressure fluctuation $p'_1$ is related to the upstream velocity fluctuation $u'_1$ by:

$$p'_1 = \rho a u'_1 \left[ 1 + M \left\{ \left(\frac{A}{A_v} - 1\right)^2 + K\left(\frac{A}{A_v}\right)^2 \right\} \right] + \rho L_e \frac{\partial u'_1}{\partial t}$$

where
M is the flow Mach number upstream of the control valve
A is the pipe area upstream of the valve
$A_v$ is the valve control area
K is the steady state loss coefficient through the valve
$L_e$ is the effective length of fluid accelerated by the unsteady valve pressure drop Note that when the valve is closed, $A_v \to 0$ and the valve boundary condition reduces to $u'_1 = 0$, which is a rigid wall reflecting condition.

Having analyzed the recorded data, using the acoustic surface analysis above to model the systems and sources, the observed data can be coupled to solutions for pressure fluctuations within the steam dome by providing boundary conditions with which to solve the wave equation at particular frequencies.

Figure 9:
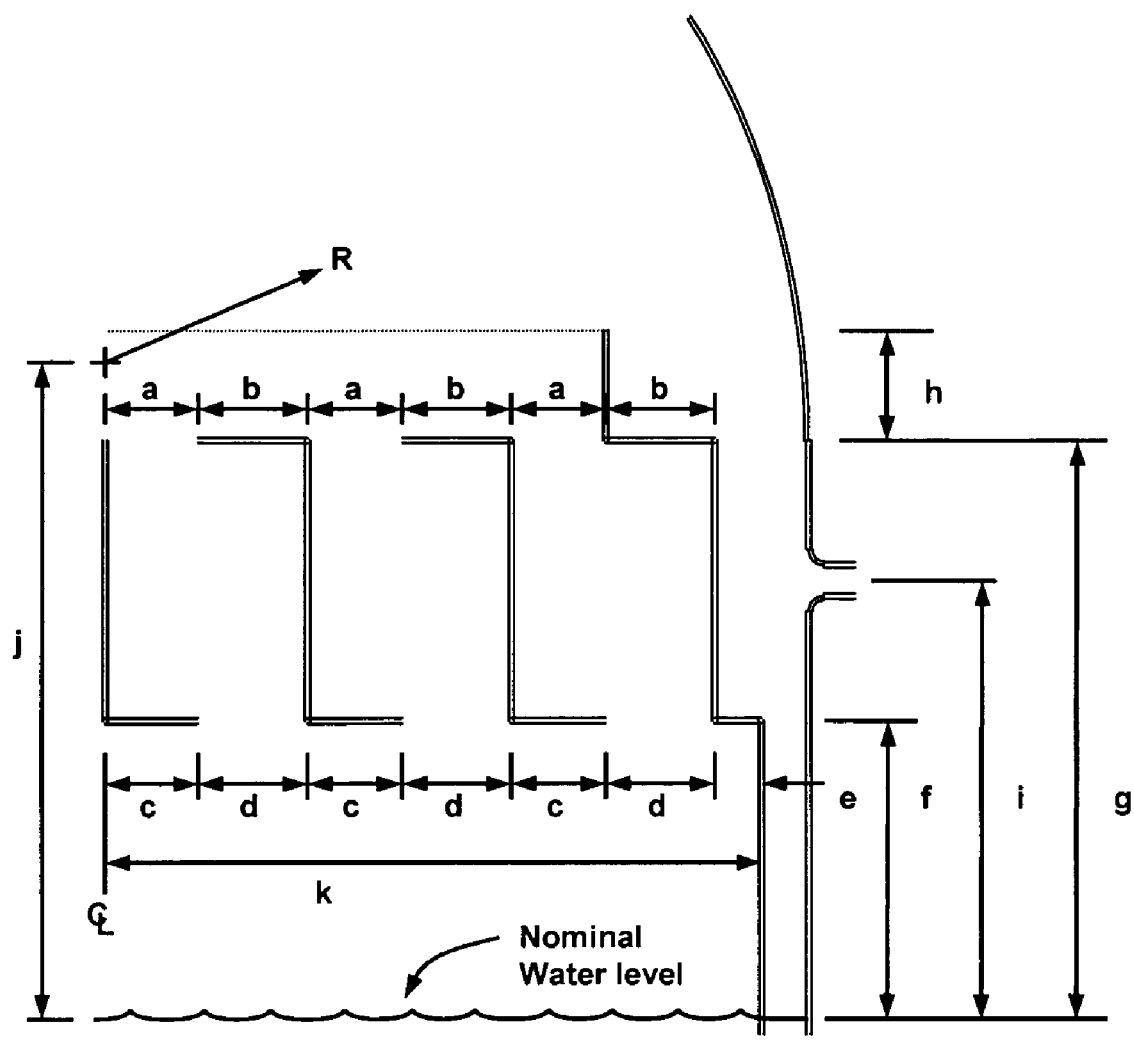
FIG. 9 is a drawing showing a schematic cross-section of part of the steam dome and steam dryers.

FIG. 9 is a drawing showing a schematic cross-section of part of the steam dome and steam dryers. Typical dimensions of the components include the following a=6.0 in, b=28.5 in, c=15.5 in, d=19.0 in, e=16.25 in, f=75.0 in, g=137.0 in, h=23.0 in, i=88.5 in, j=166.63 in, k=120.0 in, and R=125.5 in.

The unsteady pressure field is determined by periodic solution of the wave equation, since Mach numbers in the steam dome are less than 0.1, as detailed above. Assuming harmonic time dependence, the wave equation reduces to the Helmholtz equation:

$$\nabla^2 P + \frac{\omega^2}{a^2} P = 0$$

where P represents pressure, $\omega$ represents frequency, and a represents acoustic speed. The complex three-dimensional geometry of the steam dome is rendered onto a uniformly-spaced rectangular grid with high resolution mesh spacing typically of the order of inches. The solution for the pressure P is obtained for each grid point within the steam dome.

The Helmholtz equation is solved for incremental frequencies from 0 to 200 Hz, subject to the boundary conditions:

$$\frac{\partial P}{\partial n} = 0$$

normal to all solid surfaces (i.e., the steam dome wall and interior and exterior surfaces of the dryer), and:

$$\frac{\partial P}{\partial n} = \frac{i\omega}{a} ZP$$

normal to the nominal water level surface. The variable Z is an order 1 constant that controls the amount of radiation of acoustic energy into the boiling water. In addition, appropriate boundary velocities corresponding to measurements and analysis of the external steam system are applied at the steam inlets. The numerical solution is determined using a finite difference approximation of the governing equation and a preconditioned iterative scheme to solve the resulting discrete equations for the non-symmetric solution.

Figure 10:
FIG. 10 shows a representative Helmholtz solution at 50 Hz.

A representative solution at 50 Hz is shown in FIG. 10, in which a unit pressure is applied to one inlet to a main steam line, and zero pressure is applied to the remaining three inlets.

Figure 11:
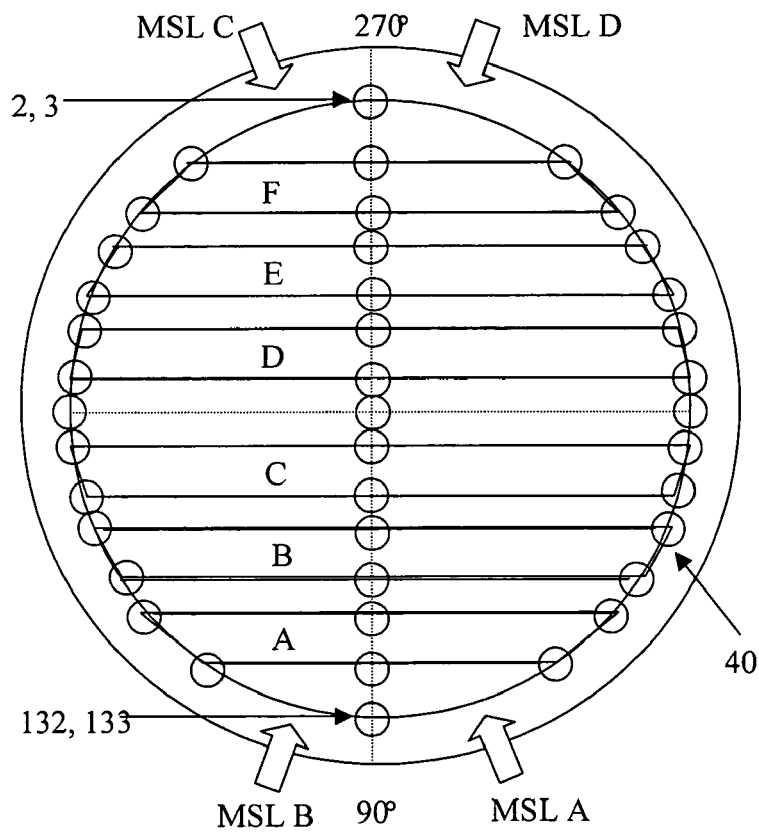
FIG. 11A is a schematic plan view of a steam dryer inside an exemplary BWR steam dome showing the physical locations of pressure data calculated by a preferred embodiment of the method of this invention.
FIG. 11B is a schematic cross-view of a steam dryer inside an exemplary BWR steam dome showing the physical locations of pressure data calculated by a preferred embodiment of the method of this invention.

FIG. 11A is a schematic plan view of a steam dryer inside an exemplary BWR steam dome showing the physical locations of pressure data calculated by a preferred embodiment of the method of this invention. Physical location points 40 are numbered starting near the C and D main steam lines (MSLC and MSLD).

Figure 11B:
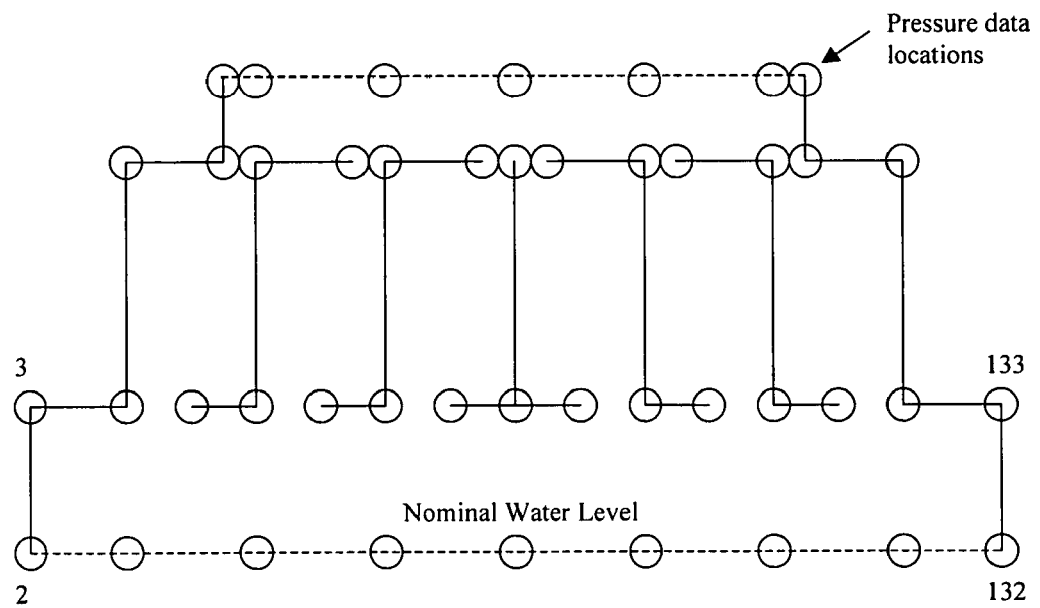

FIG. 11B is a schematic cross-view a steam dryer inside an exemplary BWR steam dome showing the physical locations of pressure data calculated by a preferred embodiment of the method of this invention.

Figure 12A:
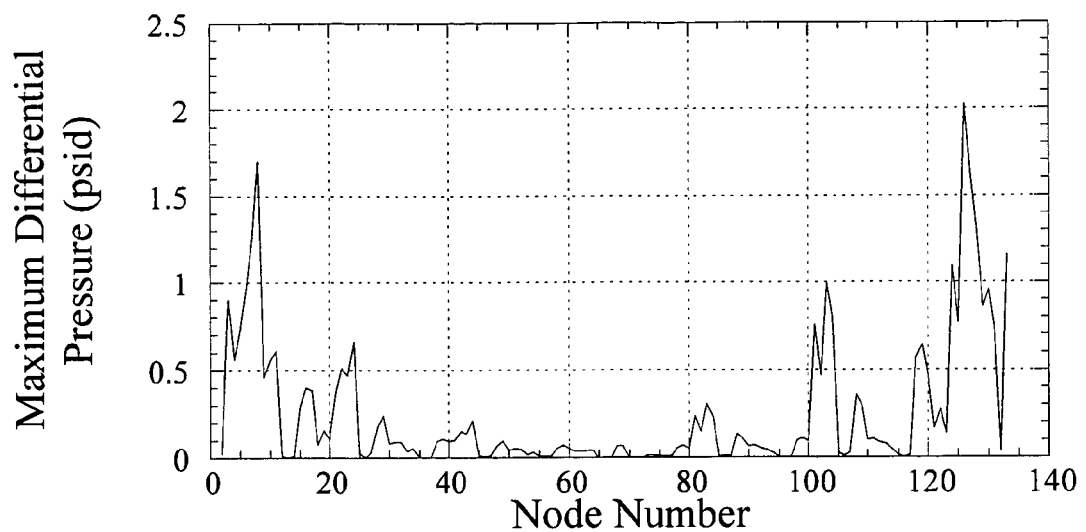
FIG. 12A shows the peak pressure levels calculated on the steam dryer inside an exemplary BWR steam dome.

FIG. 12A shows the peak pressure levels calculated on the steam dryer inside an exemplary BWR steam dome based on pressure time history measurements taken on steam pipes outside the BWR steam dome and using the methods of the present invention, as detailed above. The node numbers in FIG. 12A correspond to physical node locations shown in FIGS. 11A and 11B. The peak fluctuating pressure levels are computed maximum differential pressure across the steam dryer structure measured in pounds per square inch difference (psid).

Figure 12B:
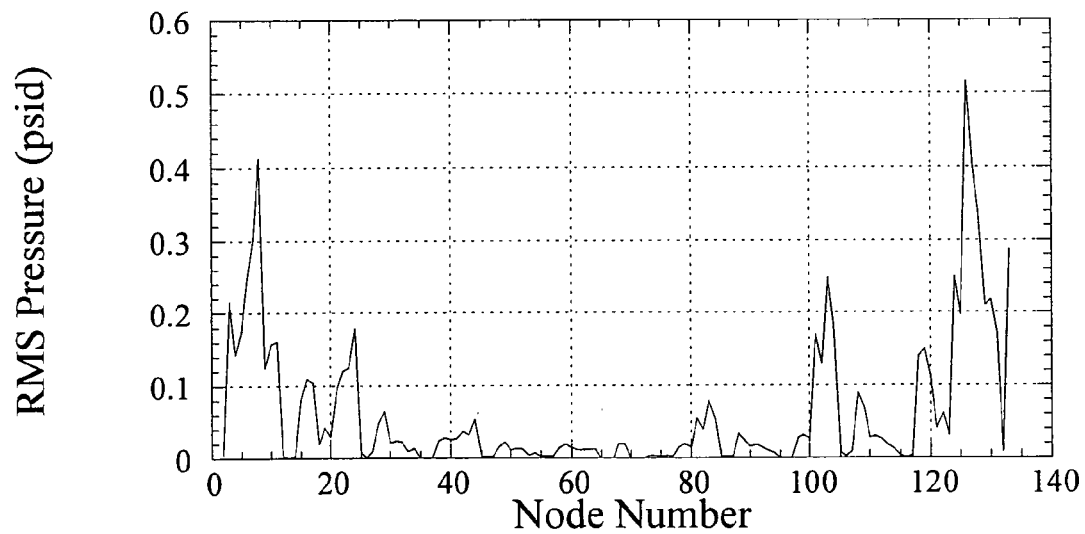
FIG. 12B shows the root mean square (RMS) pressure levels calculated on the steam dryer inside an exemplary BWR steam dome.

FIG. 12B shows the root mean square (RMS) differential pressure levels calculated on the steam dryer inside an exemplary BWR steam dome based on pressure time history measurements taken on steam pipes outside the BWR steam dome and using the methods of the present invention, as detailed above. The node numbers in FIG. 12B correspond to physical node locations shown in FIGS. 11A and 11B.

Figure 13A:
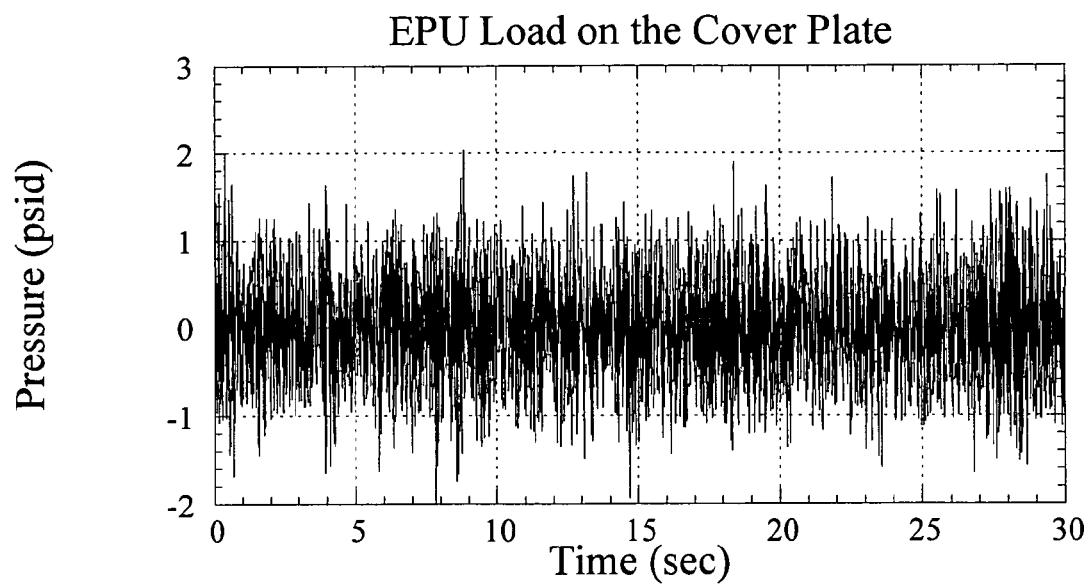
FIG. 13A shows a representative pressure time history measured by a typical fluctuating pressure sensor.

FIG. 13A shows a representative computed pressure time history on the steam dryer structure.

Figure 13B:
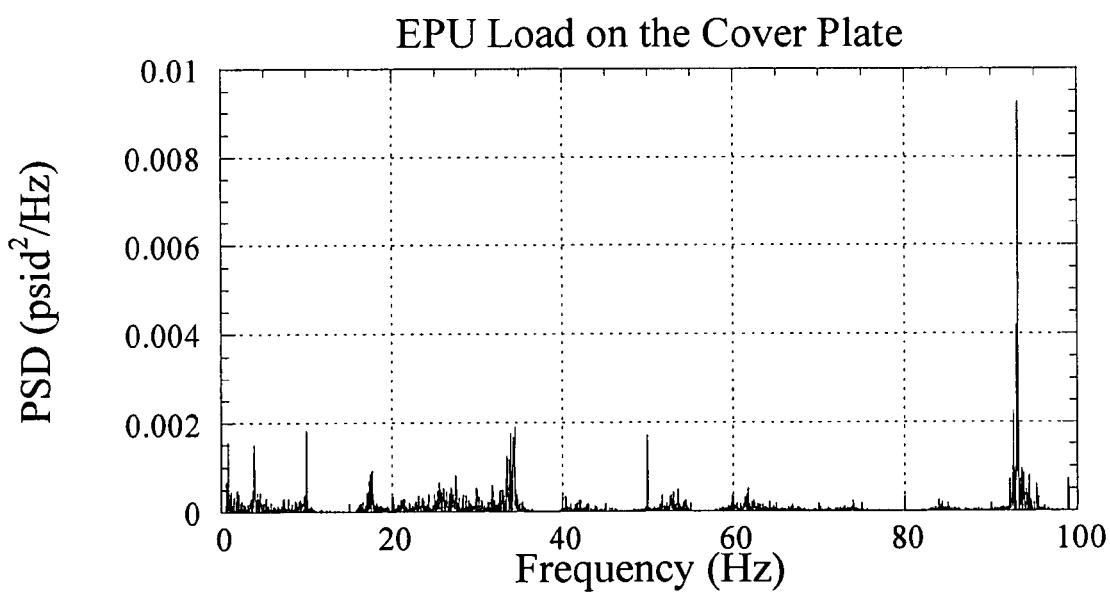
FIG. 13B shows a pressure power spectral density (PSD).

FIG. 13B shows a pressure power spectral density (PSD), measured in pounds per square inch squared per Hertz, of the representative computed pressure time history of FIG. 13A. The pressure power spectral density shows that energy exists at discrete frequencies in the pressure time history.

Because the method of this invention can model fluctuating pressure at any point within the system, one method to validate the method is to compare a measured pressure at a point outside the steam chamber with the pressure calculated at that point using data from the other sensors.

TABLE 1

Comparison of measured and predicted pressure at a strain gage on main steam line B.

|  | Peak Pressure (psid) | $P_{rms}$ (psid) |
|---|---|---|
| SB | 11.44 | 2.80 |
| Prediction | 11.82 | 2.79 |

Table 1.: Comparison of measured and predicted pressure at a strain gage on main steam line B.

Table 1 shows a comparison of the measured and calculated peak and rms pressures at the strain gage on the B line of FIG. 6 (instrument SB). The first row gives the measured peak and rms pressures. The second row is the predicted pressures, based on the calculations using the measurements at the other sensors. The close correlation between measured and predicted pressure is a validation of the method of this invention.

Figure 14A:
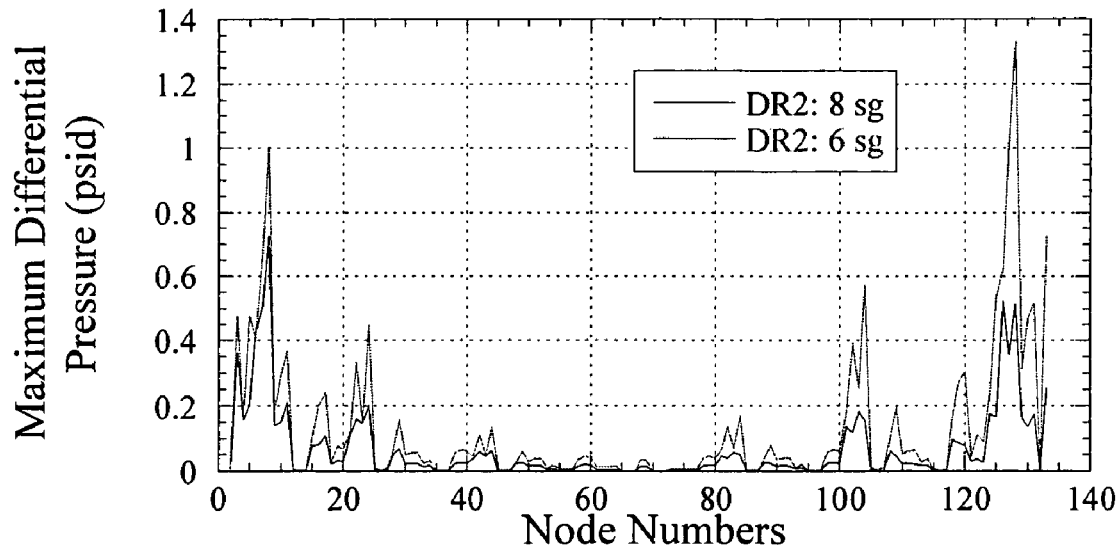
FIGS. 14A and 14B show the comparison of using enough measurements to resolve all predicted sources within the system compared to the method of having to infer coherence of two sources close to the model.
Figure 14B:
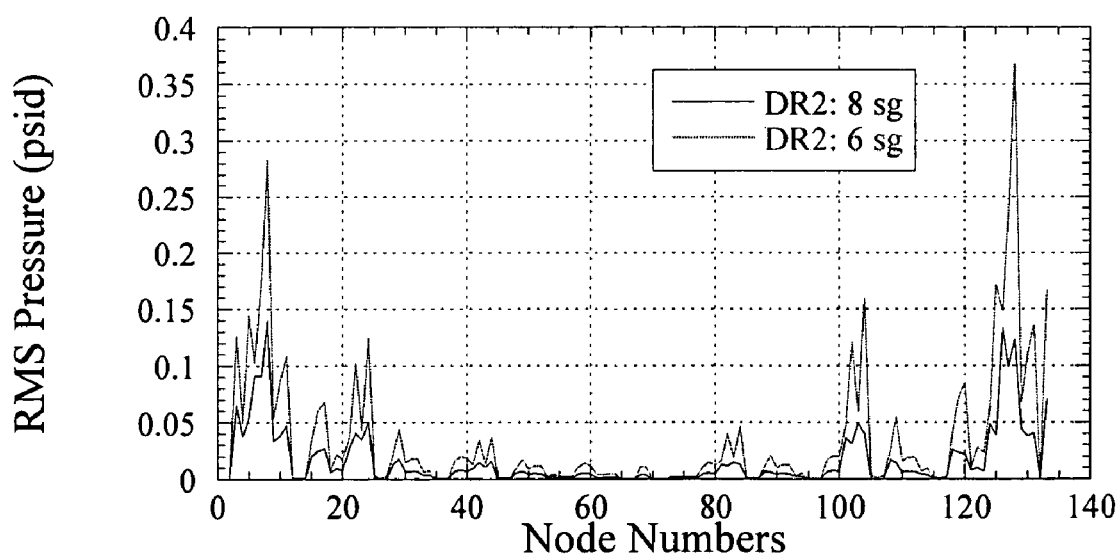

FIGS. 14A and 14B show the comparison of using enough measurements to resolve all predicted sources within the system compared to the method of having to infer coherence of at least one source to close the model.

To assess the impact of computing dryer loads in a situation having eight possible acoustic source locations using only six independent measurements and assuming that the acoustic sources at the main steam line junctions the steam dome are in phase ($\eta'_a(t)=\eta'_b(t)$ and $\eta'_c(t)=\eta'_d(t)$), the dryer loads were computed using both assumptions. Curves DR2 8 sg are the results of calculations using 8 independent strain gage measurements. Curves DR2 6 sg are the results of calculations using 6 independent strain gage measurements and assuming the coherence between sources detailed above. Peak and RMS pressures are compared in FIGS. 14A and 14B where it is seen that assuming head loss coefficient on the inlet to the A and B main steam lines are equal and on the inlet to the C and D main steam lines are also equal results in a conservative prediction of dryer load. This result justifies the use of this methodology with BWR plants where fewer than the ideal number of independent measurements of pressure are possible.

Although the invention has been described with specific reference to BWR plants, one of ordinary skill will readily appreciate that the method of this invention can be applied to a variety of flow induced vibration (FIV) situations in which similar simplifications can be made, including analysis of PWR nuclear plants.

Furthermore, although the invention has been described with specific reference to the possible damage to steam dryers, one of ordinary skill in the art will readily appreciate that FIV damage can affect other components of piping systems including, but not limited to, causing small bore pipe fatigue and valve wear.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention

What is claimed is:

1. A method of determining a fluctuating pressure loading on at least one component inside a reactor steam dome having at least one steam line for transferring steam away from said dome, said steam line being joined to said steam dome via an exit region and having at least one acoustic source therein, said method comprising:

measuring pressure as a function of time at a first location in said steam line;

measuring pressure as a function of time at a second location in said steam line, wherein there is no said acoustic source between said first and second locations;

using said pressure measurements to calculate a fluctuating steam exit velocity as a function of frequency at said exit region; and obtaining a fluctuating pressure loading as a function of frequency on said component using said fluctuating steam exit velocity as a boundary condition for solving a 3-D Helmholtz equation in said steam dome to determine if said component can operate safely at said fluctuating pressure loading, $$\nabla^2 P - \frac{1}{a^2}\frac{\partial^2 P}{\partial^2 t} = 0, \text{ and}$$

wherein said 3-D Helmholtz equation is of the form $$\nabla^2 P + \frac{\omega^2}{a^2} P = 0,$$

where P represents pressure, ω represents frequency, and a represents acoustic speed.

2. The method of claim 1 wherein said measurements are taken between said acoustic source and said steam dome.

3. The method of claim 2 further comprising taking said measurements as far away from each other as possible to increase the accuracy of said method.

4. The method of claim 3 wherein said exit velocity is calculated using acoustic circuit analysis.

5. The method of claim 4 further comprising representing said reactor steam dome and said at least one component on a uniformly-spaced rectangular grid or a non-uniform grid, wherein obtaining a fluctuating pressure loading further comprises solving said 3-D Helmholtz equation using said representation.

6. The method of claim 4 wherein said 3-D Helmholtz equation is solved for a frequency range from 0 Hz to 200 Hz.

7. The method of claim 1 wherein:
said steam dome is bounded by solid surfaces and has an interior water-steam interface when the reactor is in use, and said component has at least one solid surface;
said equation is solved using a pressure gradient ∂P/∂n in a direction n normal to interior surfaces of said steam dome as a boundary condition; and
∂P/∂n=0 at said solid surfaces of said steam dome and said component and ∂P/∂n has a value representing the amount of acoustic energy radiated into the water at said water-steam interface.

8. A system for determining a fluctuating pressure loading on at least one component inside a reactor steam dome having at least one steam line for transferring steam away from said dome, said steam line being joined to said steam dome via an exit region and having at least one acoustic source therein, said system comprising:
first means for measuring pressure as a function of time at a first location in said steam line;
second means for measuring pressure as a function of time at a second location in said steam line, wherein there is no said acoustic source between said first and second locations;
means for calculating a fluctuating steam exit velocity as a function of frequency at said exit region using said pressure measurements; and
means for obtaining a fluctuating pressure loading as a function of frequency on said component using said fluctuating steam exit velocity as a boundary condition for solving a 3-D Helmholtz equation in said steam dome to determine if said component can operate safely at said fluctuating pressure loading, $$\nabla^2 P - \frac{1}{a^2}\frac{\partial^2 P}{\partial^2 t} = 0, \text{ and}$$

wherein said 3-D Helmholtz equation is of the form $$\nabla^2 P + \frac{\omega^2}{a^2} P = 0,$$

where P represents pressure, ω represents frequency, and a represents acoustic speed.

9. The system of claim 8 wherein said measurements are taken between said acoustic source and said steam dome.

10. The system of claim 9 wherein said measurements are taken as far away from each other as possible to increase the accuracy of said system.

11. The system of claim 10 wherein said means for calculating said exit velocity uses acoustic circuit analysis to make said calculation.

12. The system of claim 8 wherein:
said steam dome is bounded by solid surfaces and has an interior water-steam interface when the reactor is in use, and said component has at least one solid surface;
said equation is solved using a pressure gradient ∂P/∂n in a direction n normal to interior surfaces of said steam dome as a boundary condition; and
∂P/∂n=0 at said solid surfaces of said steam dome and said component and ∂P/∂n has a value representing the amount of acoustic energy radiated into the water at said water-steam interface.

13. An apparatus for determining a fluctuating pressure loading on at least one component inside a reactor steam dome having at least one steam line for transferring steam away from said dome, said steam line being joined to said steam dome via an exit region and having at least one acoustic source therein, said apparatus comprising:
first means for measuring pressure as a function of time at a first location in said steam line;
second means for measuring pressure as a function of time at a second location in said steam line, wherein there is no said acoustic source between said first and second locations;
means for calculating a fluctuating steam exit velocity as a function of frequency at said exit region using said pressure measurements; and
means for obtaining a fluctuating pressure loading as a function of frequency on said component using said fluctuating steam exit velocity as a boundary condition for solving 3-D Helmholtz equation in said steam dome to determine if said component can operate safely at said fluctuating pressure loading, $$\nabla^2 P - \frac{1}{a^2}\frac{\partial^2 P}{\partial^2 t} = 0, \text{ and}$$

wherein said 3-D Helmholtz equation is of the form $$\nabla^2 P + \frac{\omega^2}{a^2} P = 0,$$

where P represents pressure, ω represents frequency, and a represents acoustic speed.

14. The apparatus of claim 13 wherein said measurements are taken between said acoustic source and said steam dome.

15. The apparatus of claim 14 wherein said measurements are taken as far away from each other as possible to increase the accuracy of said apparatus.

16. The apparatus of claim 15 wherein said means for calculating said exit velocity uses acoustic circuit analysis to make said calculation.

17. The apparatus of claim 13 wherein:
said steam dome is bounded by solid surfaces and has an interior water-steam interface when the reactor is in use, and said component has at least one solid surface;
said equation is solved using a pressure gradient ∂P/∂n in a direction n normal to interior surfaces of said steam dome as a boundary condition; and
∂P/∂n=0 at said solid surfaces of said steam dome and said component and ∂P/∂n has a value representing the amount of acoustic energy radiated into the water at said water-steam interface.

18. An apparatus for determining a fluctuating pressure loading on at least one component inside a reactor steam dome having at least one steam line for transferring steam away from said dome, said steam line being joined to said steam dome via an exit region and having at least one acoustic source therein, said apparatus comprising:
a computing device comprising a computer-readable medium comprising instructions for:
measuring pressure as a function of time at a first location in said steam line;
measuring pressure as a function of time at a second location in said steam line, wherein there is no said acoustic source between said first and second locations;
using said pressure measurements to calculate a fluctuating steam exit velocity as a function of frequency at said exit region; and
obtaining a fluctuating pressure loading as a function of frequency on said component using said fluctuating steam exit velocity as a boundary condition for solving a 3-D Helmholtz equation in said steam dome to determine if said component can operate safely at said fluctuating pressure loading, $$\nabla^2 P - \frac{1}{a^2}\frac{\partial^2 P}{\partial^2 t} = 0, \text{ and}$$

wherein said 3-D Helmholtz equation is of the form $$\nabla^2 P + \frac{\omega^2}{a^2} P = 0,$$

where P represents pressure, ω represents frequency, and a represents acoustic speed.

19. The apparatus of claim 18 wherein said measurements are taken as far away from each other as possible to increase the accuracy of said apparatus.

20. The apparatus of claim 18 wherein:
said steam dome is bounded by solid surfaces and has an interior water-steam interface when the reactor is in use, and said component has at least one solid surface;
said equation is solved using a pressure gradient ∂P/∂n in a direction n normal to interior surfaces of said steam dome as a boundary condition; and ∂P/∂n=0 at said solid surfaces of said steam dome and said component and ∂P/∂n has a value representing the amount of acoustic energy radiated into the water at said water-steam interface.

21. A method of determining a fluctuating pressure loading on at least one component inside a reactor steam dome having at least one steam line for transferring steam away from said dome, said steam line being joined to said steam dome via an exit region and having at least one acoustic source therein, said method comprising:
measuring pressure as a function of time at a first location in said steam line;
measuring pressure as a function of time at a second location in said steam line, wherein there is no said acoustic source between said first and second locations;
using said pressure measurements to calculate a fluctuating steam exit velocity as a function of time at said exit region; and
obtaining a fluctuating pressure loading as a function of time on said component using said fluctuating steam exit velocity as a boundary condition for solving a 3-D wave equation in said steam dome to determine if said component can operate safely at said fluctuating pressure loading,
wherein said 3-D wave equation is of the form $$\nabla^2 P - \frac{1}{a^2}\frac{\partial^2 P}{\partial^2 t} = 0,$$

where P represents pressure, t represents time, and a represents acoustic speed.

22. The method of claim 21 wherein said measurements are taken between said acoustic source and said steam dome.

23. The method of claim 22 further comprising taking said measurements as far away from each other as possible to increase the accuracy of said method.

24. The method of claim 23 wherein said exit velocity is calculated using acoustic circuit analysis.

25. The method of claim 21 further comprising representing said reactor steam dome and said at least one component on a uniformly-spaced rectangular grid or a non-uniform grid, wherein obtaining a fluctuating pressure loading further comprises solving said 3-D wave equation using said representation.

26. The method of claim 24 wherein said acoustic circuit analysis provides solutions to said 3-D wave equation in a form:

$$\frac{1}{a^2}\frac{D^2 P}{Dt^2} - \frac{\partial^2 P}{\partial x^2} = 0$$

where $$\frac{D}{Dt} = \frac{\partial}{\partial t} + U\frac{\partial}{\partial x},$$

and U is the velocity in said steam line.

27. The method of claim 26 wherein said solutions for the fluctuating pressure $P'_n$ and velocity $u'_n$ are of the form:

$$P'_n = \left[A_n e^{ik_{1n}X_n} + B_n e^{ik_{2n}X_n}\right] e^{i\omega t}$$

$$u'_n = -\frac{1}{\overline{\rho}\overline{a}^2}\left[\frac{(\omega + \overline{U}_n k_{1n})}{k_{1n}} A_n e^{ik_{1n}X_n} + \frac{(\omega + \overline{U}_n k_{2n})}{k_{2n}} B_n e^{ik_{2n}X_n}\right] e^{i\omega t}$$

where the wave numbers $k_{1n}$ and $k_{2n}$ are the two complex roots of the equation:

$$k_n^2 + if_n \frac{|\overline{U}_n|}{D_n \overline{a}^2}(\omega + \overline{U}_n k_n) - \frac{1}{\overline{a}^2}(\omega + \overline{U}_n k_n)^2 = 0$$

where $f_n$ is a pipe friction factor for the nth element, $D_n$ is an hydraulic diameter, $i=\sqrt{-1}$ and complex constants $A_n$ and $B_n$ are a function of frequency determined by satisfying continuity of pressure and mass conservation at element junctions.

28. The method of claim 21 wherein:

said steam dome is bounded by solid surfaces and has an interior water-steam interface when the reactor is in use, and said component has at least one solid surface;

said equation is solved using a pressure gradient $\partial P/\partial n$ in a direction n normal to interior surfaces of said steam dome as a boundary condition; and $\partial P/\partial n=0$ at said solid surfaces of said steam dome and said component and $\partial P/\partial n$ has a value representing the amount of acoustic energy radiated into the water at said water-steam interface.

29. A system for determining a fluctuating pressure loading on at least one component inside a reactor steam dome having at least one steam line for transferring steam away from said dome, said steam line being joined to said steam dome via an exit region and having at least one acoustic source therein, said system comprising:

first means for measuring pressure as a function of time at a first location in said steam line;

second means for measuring pressure as a function of time at a second location in said steam line, wherein there is no said acoustic source between said first and second locations;

means for calculating a fluctuating steam exit velocity as a function of time at said exit region using said pressure measurements; and means for obtaining a fluctuating pressure loading as a function of time on said component using said fluctuating steam exit velocity as a boundary condition for solving a 3-D wave equation in said steam dome to determine if said component can operate safely at said fluctuating pressure loading, wherein said 3-D wave equation is of the form $$\nabla^2 P - \frac{1}{a^2}\frac{\partial^2 P}{\partial^2 t} = 0,$$

where P represents pressure, t represents time, and a represents acoustic speed.

30. The system of claim 29 wherein said measurements are taken between said acoustic source and said steam dome.

31. The system of claim 30 wherein said measurements are taken as far away from each other as possible to increase the accuracy of said system.

32. The system of claim 31 wherein said means for calculating said exit velocity uses acoustic circuit analysis to make said calculation.

33. The system of claim 29 wherein:

said steam dome is bounded by solid surfaces and has an interior water-steam interface when the reactor is in use, and said component has at least one solid surface;

said equation is solved using a pressure gradient $\partial P/\partial n$ in a direction n normal to interior surfaces of said steam dome as a boundary condition; and $\partial P/\partial n=0$ at said solid surfaces of said steam dome and said component and $\partial P/\partial n$ has a value representing the amount of acoustic energy radiated into the water at said water-steam interface.

34. An apparatus for determining a fluctuating pressure loading on at least one component inside a reactor steam dome having at least one steam line for transferring steam away from said dome, said steam line being joined to said steam dome via an exit region and having at least one acoustic source therein, said apparatus comprising:

first means for measuring pressure as a function of time at a first location in said steam line;

second means for measuring pressure as a function of time at a second location in said steam line, wherein there is no said acoustic source between said first and second locations;

means for calculating a fluctuating steam exit velocity as a function of time at said exit region using said pressure measurements; and means for obtaining a fluctuating pressure loading as a function of time on said component using said fluctuating steam exit velocity as a boundary condition for solving a 3-D wave equation in said steam dome to determine if said component can operate safely at said fluctuating pressure loading, wherein said 3-D wave equation is of the form $$\nabla^2 P - \frac{1}{a^2}\frac{\partial^2 P}{\partial^2 t} = 0,$$

where P represents pressure, t represents time, and a represents acoustic speed.

35. The apparatus of claim 34 wherein said measurements are taken between said acoustic source and said steam dome.

36. The apparatus of claim 35 wherein said measurements are taken as far away from each other as possible to increase the accuracy of said apparatus.

37. The apparatus of claim 36 wherein said means for calculating said exit velocity uses acoustic circuit analysis to make said calculation.

38. The apparatus of claim 34 wherein:

said steam dome is bounded by solid surfaces and has an interior water-steam interface when the reactor is in use, and said component has at least one solid surface;

said equation is solved using a pressure gradient $\partial P/\partial n$ in a direction n normal to interior surfaces of said steam dome as a boundary condition; and $\partial P/\partial n=0$ at said solid surfaces of said steam dome and said component and $\partial P/\partial n$ has a value representing the amount of acoustic energy radiated into the water at said water-steam interface.

39. An apparatus for determining a fluctuating pressure loading on at least one component inside a reactor steam dome having at least one steam line for transferring steam away from said steam dome, said steam line being joined to said dome via an exit region and having at least one acoustic source therein, said apparatus comprising:

a computing device comprising a computer-readable medium comprising instructions for:

measuring pressure as a function of time at a first location in said steam line;

measuring pressure as a function of time at a second location in said steam line, wherein there is no said acoustic source between said first and second locations;

using said pressure measurements to calculate a fluctuating steam exit velocity as a function of time at said exit region; and obtaining a fluctuating pressure loading as a function of time on said component using said fluctuating steam exit velocity as a boundary condition for solving a 3-D wave equation in said steam dome to determine if said component can operate safely at said fluctuating pressure loading, wherein said 3-D wave equation is of the form $$\nabla^2 P - \frac{1}{a^2}\frac{\partial^2 P}{\partial^2 t} = 0,$$

where P represents pressure, t represents time, and a represents acoustic speed.

40. The apparatus of claim 39 wherein said measurements are taken as far away from each other as possible to increase the accuracy of said apparatus.

41. The apparatus of claim 39 wherein:

said steam dome is bounded by solid surfaces and has an interior water-steam interface when the reactor is in use, and said component has at least one solid surface;

said equation is solved using a pressure gradient $\partial P/\partial n$ in a direction n normal to interior surfaces of said steam dome as a boundary condition; and $\partial P/\partial n = 0$ at said solid surfaces of said steam dome and said component and $\partial P/\partial n$ has a value representing the amount of acoustic energy radiated into the water at said water-steam interface.

* * * * *